(12) United States Patent
Yamashita et al.

(10) Patent No.: US 6,983,733 B2
(45) Date of Patent: Jan. 10, 2006

(54) DIRECT-INJECTION SPARK-IGNITION ENGINE

(75) Inventors: Hiroyuki Yamashita, Fuchu-cho (JP); Noriyuki Ohta, Fuchu-cho (JP); Fumihiko Saito, Fuchu-cho (JP); Keiji Araki, Fuchu-cho (JP)

(73) Assignee: Mazda Motor Corporation, Hiroshima (JP)

( * ) Notice: Subject to any disclaimer, the term of this patent is extended or adjusted under 35 U.S.C. 154(b) by 92 days.

(21) Appl. No.: 10/457,752

(22) Filed: Jun. 9, 2003

(65) Prior Publication Data

US 2004/0011326 A1 Jan. 22, 2004

(30) Foreign Application Priority Data

Jun. 11, 2002 (JP) ........................................ 2002-170298

(51) Int. Cl.
*F02B 5/00* (2006.01)

(52) U.S. Cl. ........................................ 123/305; 123/295
(58) Field of Classification Search ................. 123/295, 123/298, 299, 300, 301, 305, 430
See application file for complete search history.

(56) References Cited

U.S. PATENT DOCUMENTS 4,217,871 A    8/1980  Ohashi et al.

| 4,790,270 A | * | 12/1988 | McKay et al. ............ 123/73 C |
| 5,775,288 A | * | 7/1998 | Suzuki et al. ................ 123/298 |
| 6,357,402 B1 | * | 3/2002 | Kato ......................... 123/73 C |
| 6,622,693 B2 | * | 9/2003 | Arndt et al. ................. 123/299 |
| 2001/0015194 A1 |  | 8/2001 | Shiraishi et al. |

FOREIGN PATENT DOCUMENTS

| DE | 38 24 467 A1 | 1/1990 |
| DE | 198 04 463 A1 | 2/1998 |
| DE | 100 32 330 A1 | 7/2000 |
| DE | 101 24 750 A1 | 5/2001 |
| EP | 1 088 971 A2 | 9/2000 |
| JP | 03 003 934 A | 1/1991 |
| JP | 10054246 | 2/1998 |
| JP | 2001248443 | 9/2001 |
| WO | PCT/JP00/05984 A1 | 9/2000 |

* cited by examiner

*Primary Examiner*—Mahmoud Gimie
(74) *Attorney, Agent, or Firm*—Brooks Kushman P.C.

(57) ABSTRACT

A direct-injection spark-ignition engine includes a spark plug provided approximately at the center of the ceiling of a combustion chamber, and an injector having at its downstream end a nozzle which is located in an upper peripheral area of the combustion chamber, in which multiple openings are formed in the nozzle of the injector. Fuel is injected from the nozzle of the injector directly toward the proximity of an electrode of the spark plug. The directions of axis lines of the individual openings are set such that central points of fuel jets spewed out of the individual openings do not lie on the spark plug but are distributed around the electrode, slightly separated therefrom.

8 Claims, 11 Drawing Sheets

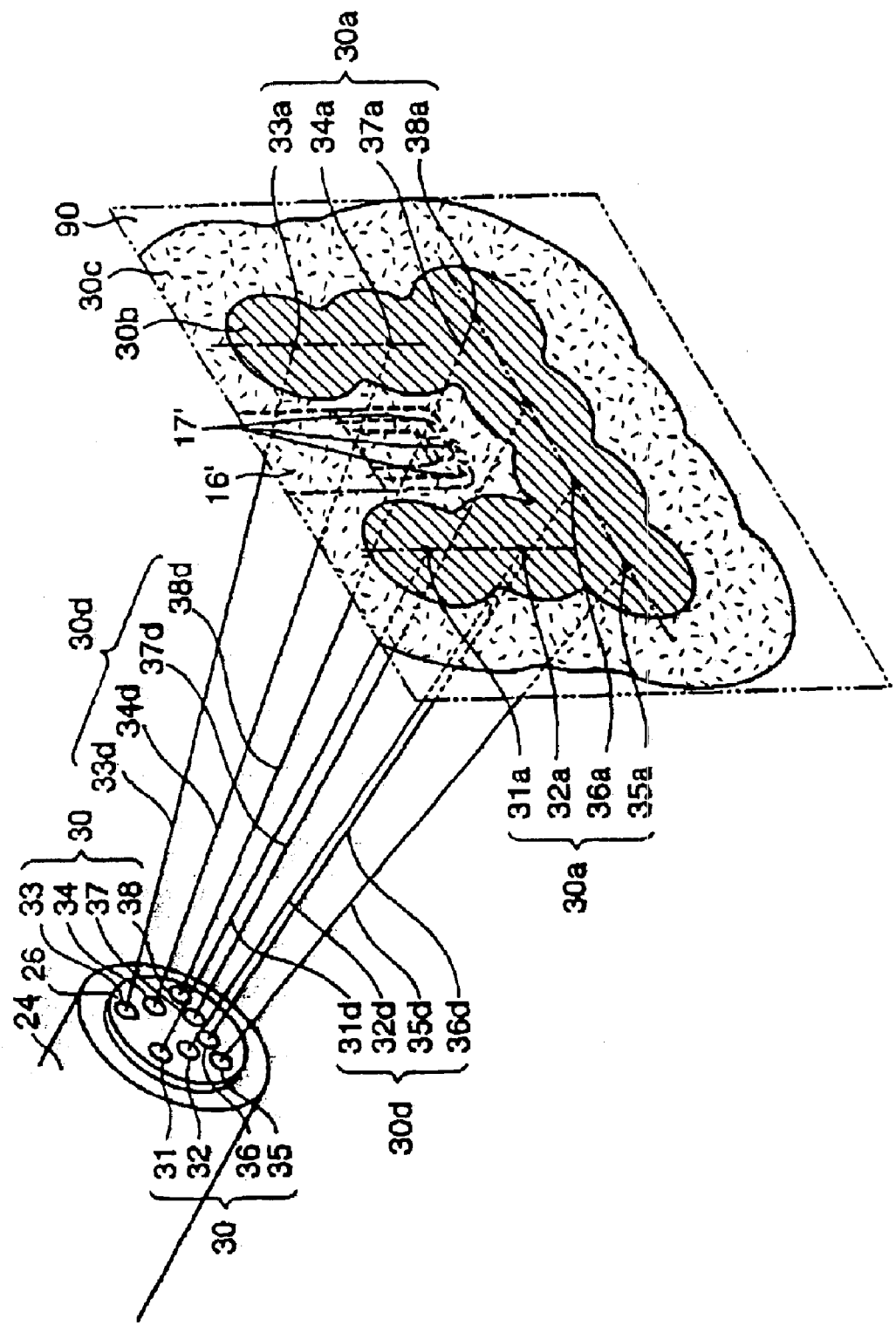

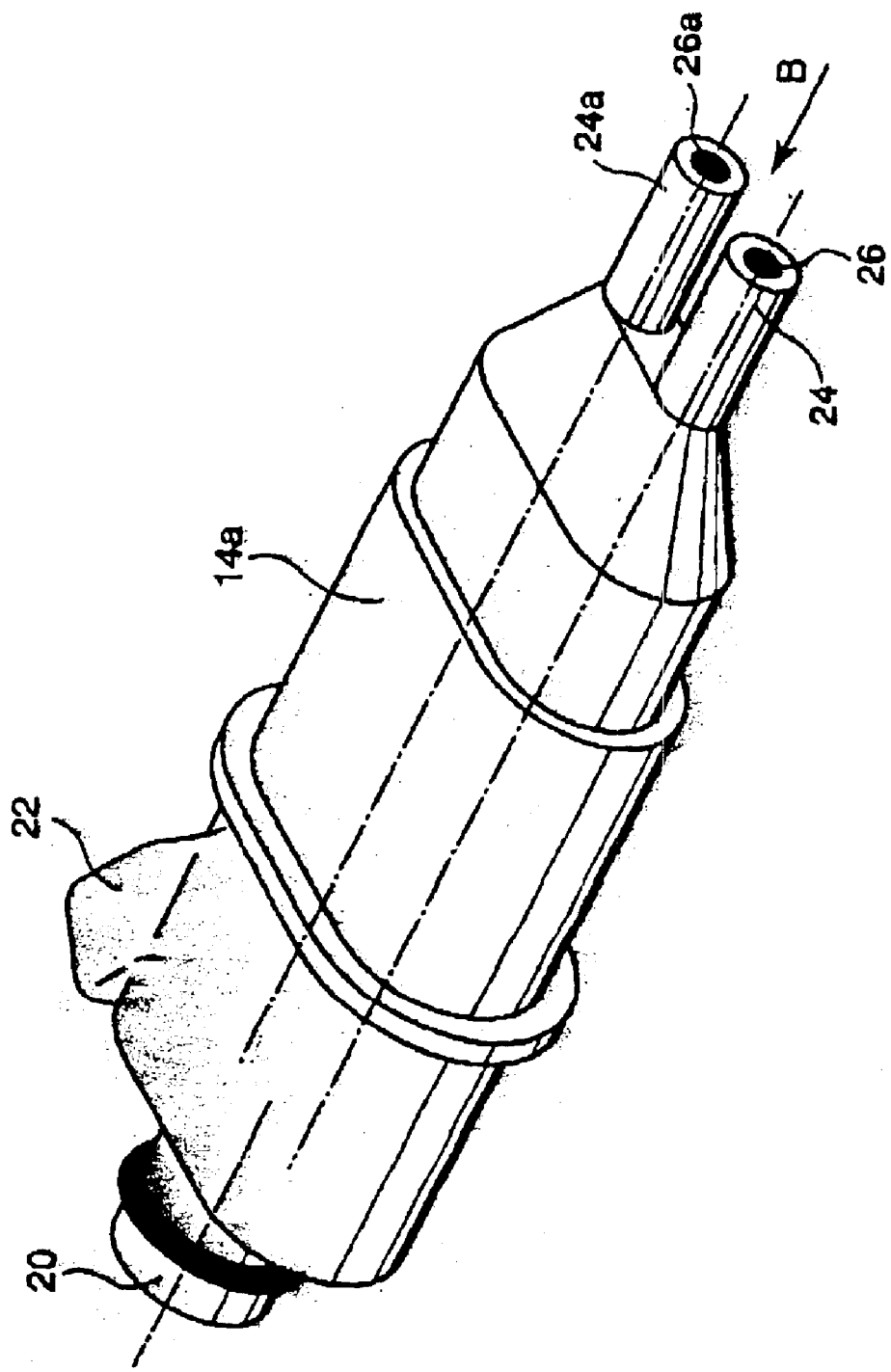

FIG.11
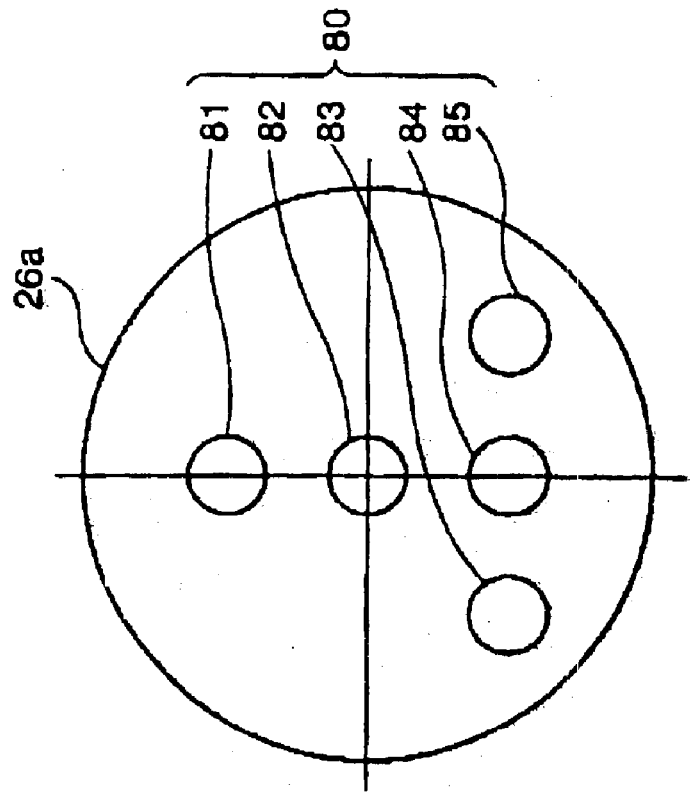
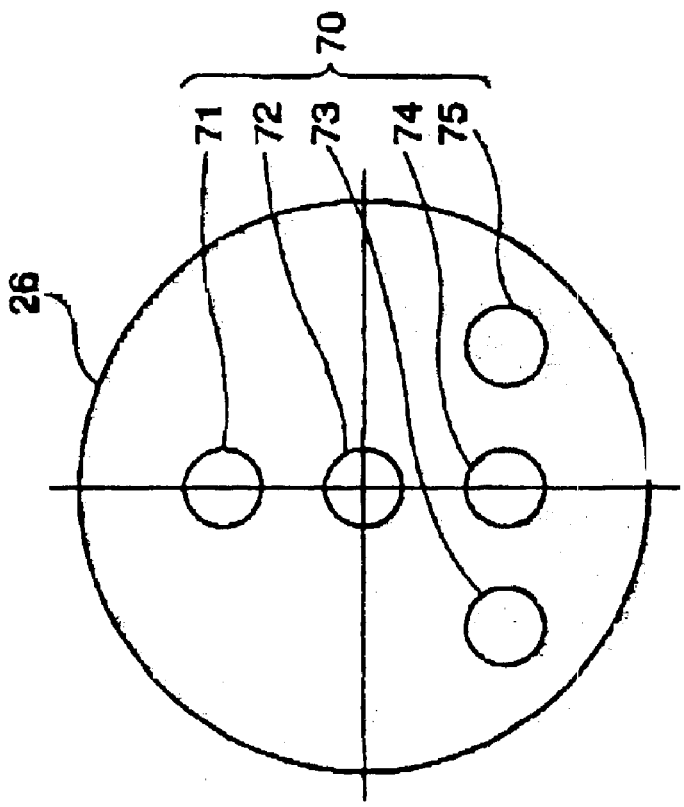

DIRECT-INJECTION SPARK-IGNITION ENGINE

BACKGROUND OF THE INVENTION

1. Field of the Invention

The present invention relates to a direct-injection spark-ignition engine in which an end of an injector is located inside a combustion chamber such that a mist of fuel sprayed from the injector is locally distributed in the proximity of an electrode of a spark plug.

2. Description of the Related Art

There exists a conventionally known direct-injection spark-ignition engine which is provided with a spark plug and an injector for feeding fuel directly into a combustion chamber to achieve an improvement in fuel economy by stratified charge combustion. In this kind of engine, it is necessary to accelerate evaporation and atomization of the fuel while minimizing dispersion of the fuel and to maintain a condition under which an ignitable mixture of an appropriate air-fuel ratio is locally distributed around an electrode of the spark plug.

Techniques for achieving such objectives are disclosed in Japanese Unexamined Patent Publication Nos. 1998-54246 and 2001-248443, for example, in which the fuel is injected directly to the proximity of an electrode of a spark plug such that the fuel would scarcely go into contact with cylinder walls or a piston in a combustion chamber.

These prior art examples, however, have a problem that the fuel sprayed toward the electrode of the spark plug is apt to form droplets around the electrode and stick thereto. The fuel droplets adhering to the electrode and its surrounding areas could cause an electric leakage resulting in an ignition failure. Another problem of the prior art examples is that the mixture could become excessively rich around the electrode. It has conventionally been desired to solve these problems because they would cause a reduction in engine power, deterioration of fuel economy or an increase in the amount of emissions.

SUMMARY OF THE INVENTION

In light of the foregoing, it is an object of the invention to provide a direct-injection spark-ignition engine which can prevent adhesion of fuel droplets to an electrode of a spark plug and formation of an excessively rich mixture around the electrode while offering a capability to evaporate and atomize the fuel.

In the context of this Specification, the direction in which a piston moves back and forth is referred to as the vertical direction, assuming that a combustion chamber and a crankshaft are located at the top and bottom, respectively. Also, the direction of the longitudinal axis of an injector oriented perpendicular to the vertical direction is referred to as the horizontal direction.

According to the invention, a direct-injection spark-ignition engine includes a spark plug provided approximately at the center of the ceiling of a combustion chamber, and an injector having at its downstream end a nozzle which is located in an upper peripheral area of the combustion chamber, in which multiple openings are formed in the nozzle of the injector. In this direct-injection engine, fuel is injected from the nozzle of the injector directly toward the proximity of an electrode of the spark plug, and the directions of axis lines of the individual nozzle openings are set such that central points of fuel jets spewed out of the individual nozzle openings do not lie on the spark plug but are distributed around the electrode, slightly separated therefrom.

This construction of the invention helps accelerate evaporation and atomization of the fuel as the fuel is injected through the multiple nozzle openings and dispersed in the form of fine particles. Since the central points of the fuel jets spewed out of the nozzle openings do not lie on the spark plug, it is possible to reduce the amount of fuel droplets adhering to the electrode and its surrounding areas. Furthermore, since the central points of the fuel jets, where the richest masses of fuel mists are present, are distributed around the electrode, slightly separated therefrom, it is possible to prevent formation of an excessively rich mixture at the electrode and properly regulate the air-fuel ratio around it to an ignitable level.

The direct-injection spark-ignition engine thus constructed serves to achieve an increase in engine power, an improvement in fuel economy and a reduction in the amount of emissions.

These and other objects, features and advantages of the invention will become more readily apparent from the following description and drawings.

BRIEF DESCRIPTION OF THE DRAWINGS

FIG. 5 is a diagram showing how individual fuel jets spewed from the injector are distributed immediately before ignition according to the first embodiment;

FIG. 10 is a perspective view of an injector according to a sixth embodiment of the invention;

FIG. 11 is an enlarged view of nozzle opening areas of the injector shown in FIG. 10.

DETAILED DESCRIPTION OF THE PREFERRED EMBODIMENTS OF THE INVENTION

Now, the invention is described with reference to direct-injection spark-ignition engines according to specific embodiments thereof.

First Embodiment

Figure 1:
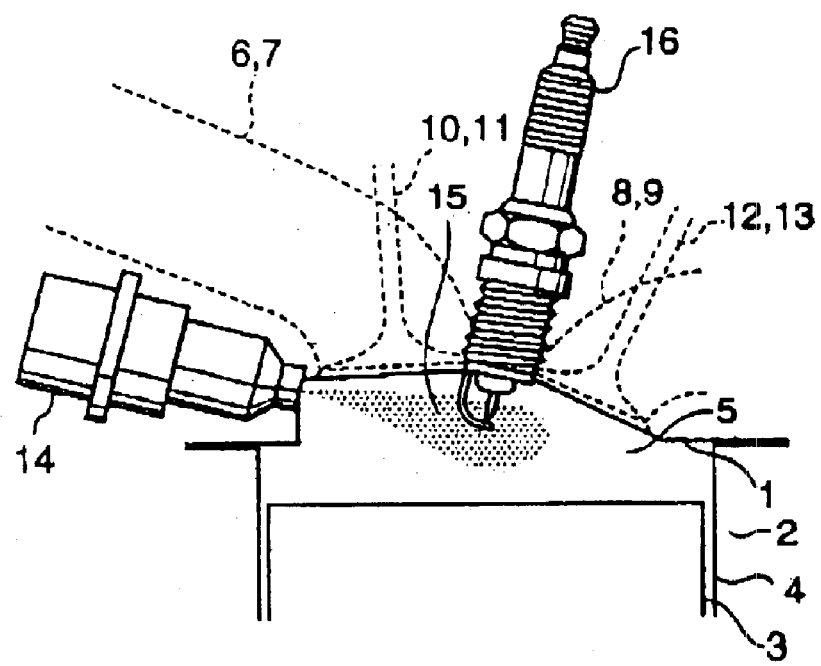
FIG. 1 is a fragmentary cross-sectional view of a direction-injection spark-ignition engine according to a first embodiment of the invention.

FIG. 1 is a fragmentary cross-sectional view of a direct-injection spark-ignition engine according a first embodiment of the invention, in which designated by the numeral 1 is a cylinder head mounted on top of a cylinder block 2, designated by the numeral 3 is a piston fitted in a cylinder bore 4 formed in the cylinder block 2, and designated by the numeral 5 is a combustion chamber formed between a top surface of the piston 3 and a bottom surface of the cylinder head 1. There is formed a cavity in the bottom surface of the cylinder head 1 to constitute a ceiling of the combustion chamber 5.

In this embodiment, two each intake ports 6, 7 and exhaust ports 8, 9 opening into the combustion chamber 5 in each cylinder are formed in the cylinder head 1. Intake valves 10 and 11 are provided in the intake ports 6 and 7 while exhaust valves 12 and 13 are provided in the exhaust ports 8 and 9, respectively. These intake valves 10, 11 and exhaust valves 12, 13 are actuated by unillustrated camshafts.

An injector 14 for injecting fuel directly into the combustion chamber 5 and a spark plug 16 are fitted in the cylinder head 1. A downstream end of the injector 14 is located in an upper peripheral area of the combustion chamber 5 while an end of the spark plug 16 is located approximately at the center of the ceiling of the combustion chamber 5. FIG. 1 shows a state in which the injector 14 has just injected a fuel spray 15 into the combustion chamber 5.

The direct-injection spark-ignition engine of the embodiment is a four-stroke engine employing a four-stroke cycle which includes four successive strokes: an intake stroke, a compression stroke, an expansion stroke and an exhaust stroke. The intake valves 10, 11 are opened and the piston 3 moves downward to intake air into the combustion chamber 5 in the intake stroke. The intake valves 10, 11 are closed and the piston 3 moves upward to compress the air in the combustion chamber 5 in the compression stroke. A compressed air-fuel mixture in the combustion chamber 5 is burned to drive the piston 3 downward due to a high pressure created by combustion in the combustion chamber 5 in the expansion stroke. The exhaust valves 12, 13 are opened so that burned gases can escape from the combustion chamber 5 as the piston 3 moves upward in the exhaust stroke. In stratified charge combustion ranges (e.g., a low-speed medium-load range), the fuel is injected with appropriate timing during the compression stroke from the injector 14 in such a manner that the fuel is locally distributed around the spark plug 16 as it is ignited and burned.

Figure 2:
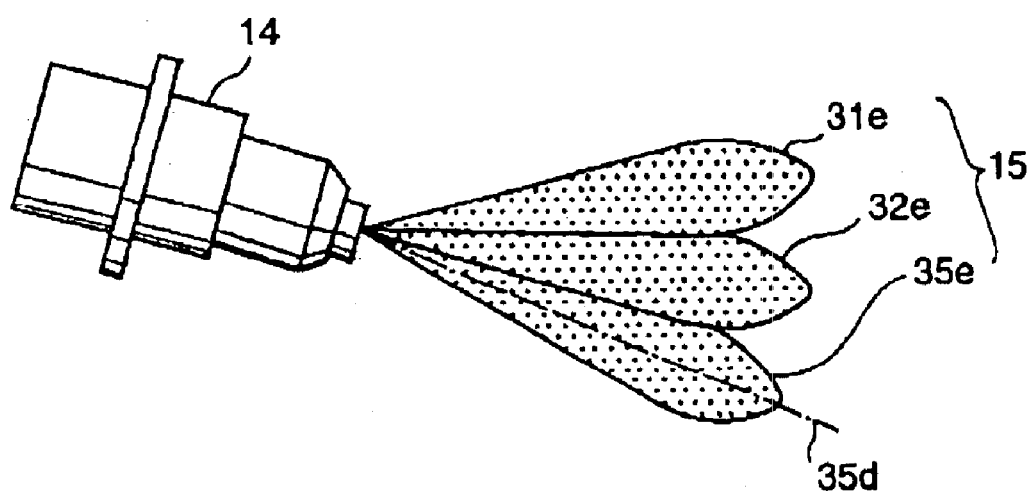
FIG. 2 is a diagram showing how a fuel spray is injected into the direct-injection spark-ignition engine according to the first embodiment of the invention.

Although the fuel spray 15 formed during the compression stroke in this embodiment looks like a single mass of fuel mist as illustrated in FIG. 1, the fuel spray 15 is actually a cluster of fuel mist streams discharged from multiple nozzle openings as illustrated in FIG. 2. The construction of the injector 14 and the fuel spray 15 formed by the injector 14 are now explained in detail.

FIG. 2 is a diagram showing how the fuel spray 15 is formed in the combustion chamber 5. As stated above, the fuel spray 15 injected from the injector 14 is a cluster of fuel mist streams discharged from the multiple nozzle openings (eight openings as will be later described in detail). Three fuel jets 31e, 32e, 35e can be seen in FIG. 2. In this multiple jet spraying, the mist of fuel sprayed in each fuel jet is centered on its spraying axis. For example, the fuel jet 35e is sprayed around its spraying axis 35d as illustrated.

Figure 3:
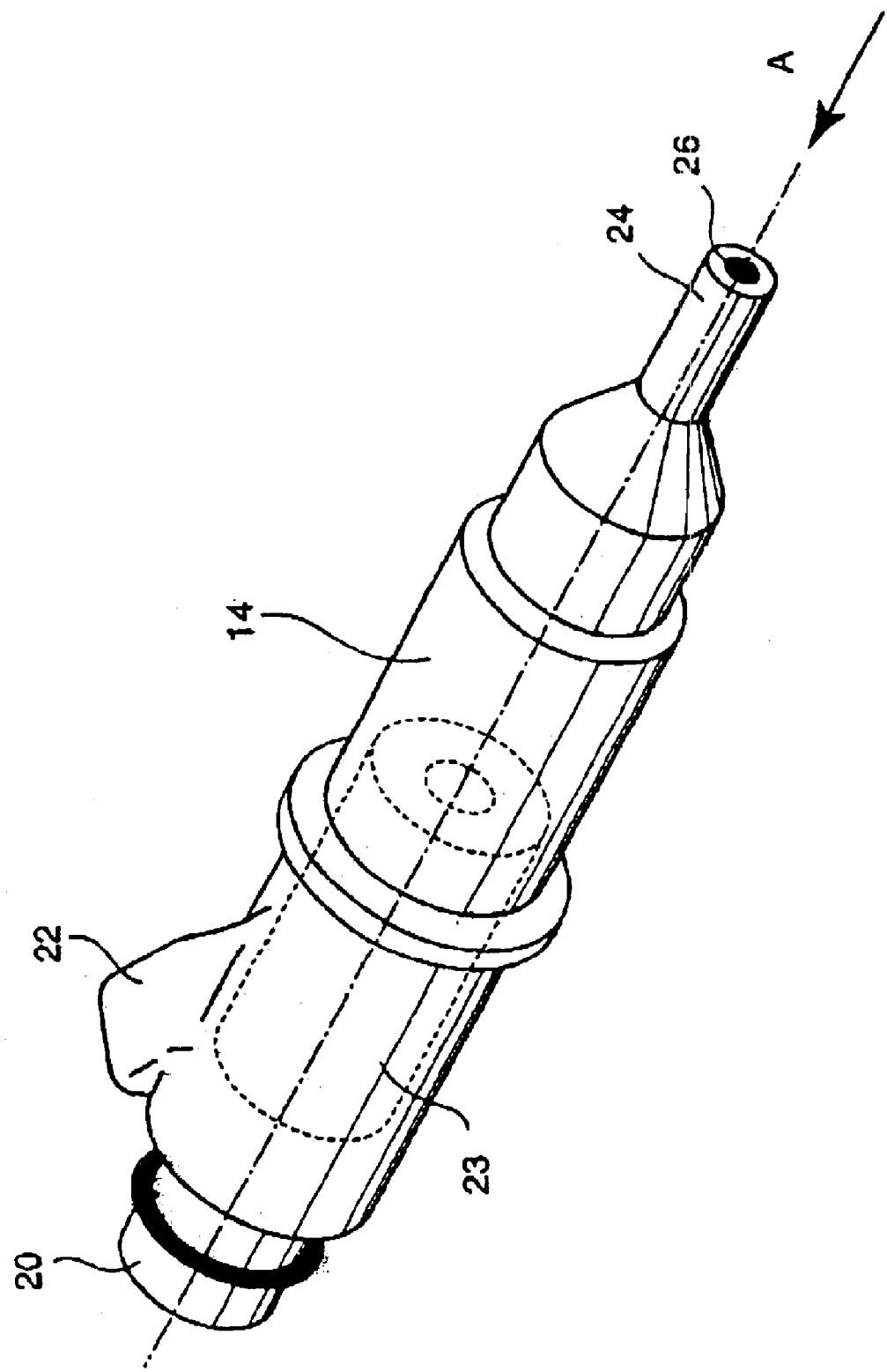
FIG. 3 is a perspective view of an injector used in the direct-injection spark-ignition engine of the first embodiment.

FIG. 3 is a perspective view of the injector 14, which is provided with a joint 20 at an upstream end and a connector 22 close to the upstream end. The fuel pressurized by a high-pressure pump (not shown) is supplied to the injector 14 through the joint 20 while a control signal for controlling the injector 14 is supplied from a controller (not shown) through the connector 22. The injector 14 has at its downstream and a cylindrical nozzle 24 projecting into the combustion chamber 5. Formed at a central part of an extreme end surface of the nozzle 24 is a nozzle opening area 26 in which the aforementioned nozzle openings are formed. Further, the injector 14 incorporates in its internal space a solenoid 23 for actuating a valve (not shown) which opens and closes the nozzle openings to inject the fuel introduced through the joint 20. The solenoid 23 actuates the valve to open the nozzle openings when the control signal supplied to the injector 14 through the connector 22 is ON.

Figure 4:
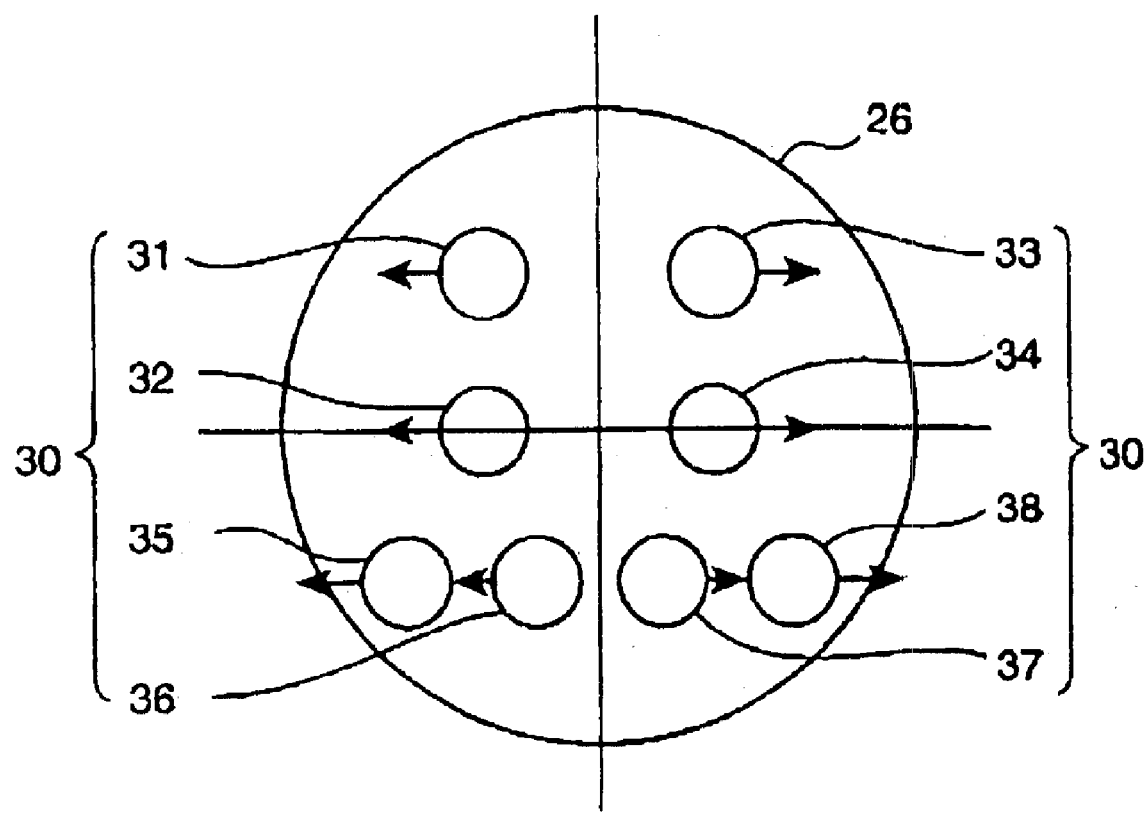
FIG. 4 is an enlarged view of a nozzle opening area of the injector shown in FIG. 3.

FIG. 4 is an enlarged diagram of the nozzle opening area 26 of the injector 14 as viewed in the direction of arrow A shown in FIG. 3. The nozzle opening area 26 of FIG. 4 is illustrated such that its upward and downward directions match those of FIG. 1.

The aforementioned eight openings, which are numbered 31 to 38 in FIG. 4, are formed in the nozzle opening area 26 as illustrated. The fuel is injected from the individual openings 31–38, which are also referred to collectively as openings 30 for the sake of explanation, to produce individual fuel jets which together form the fuel spray 15. Since the extreme end surface of the nozzle 24 of the injector 14 including the nozzle opening area 26 is slightly convex-shaped, central axes of the fuel jets are directed generally radially from the individual openings 30. Thus, axis lines of the individual openings 30 in the nozzle opening area 26 are so arranged that the fuel jets are individually inclined with respect to a central axis of the entire fuel spray 15. In FIG. 4, the directions of inclination of the axis lines of the individual openings 30 are shown by arrows affixed thereto. The length of each arrow indicates the degree of inclination of the relevant opening 30, which means the longer the arrow, the larger the angle of inclination.

As illustrated in FIG. 4, the opening 31 and 32 are vertically arranged in the left half of the nozzle opening area 26, and the opening 33 and 34 are vertically arranged in the right half of the nozzle opening area 26. The openings 35–38 are horizontally aligned in a lower part of the nozzle opening area 26. The axis lines of the openings 31, 32 and 35 are inclined to the left in front view at relatively large angles, while the axis lines of the openings 33, 34 and 38 are inclined to the right at relatively large angles. Also, the axis lines of the opening 36 is inclined to the left in front view at relatively a small angle, while the axis line of the opening 37 is inclined to the right at relatively a small angle. With the axis lines of the openings 30 arranged in this manner, the central axes of the fuel jets spewed out of the individual openings 30 extend in directions determined by adding the angles of additional inclination of the axis lines of the individual openings 30 to the inclination angles of radii of an ordinary radial pattern.

FIG. 5 is a diagram showing how the fuel jets spewed from the injector 14 are distributed as they reach the proximity of an electrode 17 of the spark plug 16 immediately before ignition. In FIG. 5, the nozzle opening area 26 is enlarged for ease of understanding and a plane 90 shown by alternate long and two short dashed lines is a vertical imaginary plane in which the spark plug 16 is located. The numerals 16' and 17' indicate the locations of the spark plug 16 and the electrode 17 (shown by broken lines) in the imaginary plane 90, respectively.

The fuel jets ejected from the nozzle openings 30 move generally toward the spark plug 16 while spreading around their respective central axes 31d–38d, which are also referred to collectively as central axes 30d. The central axes 30d of the individual fuel jets hit the imaginary plane 90 intersecting the spark plug 16 at their respective central points 31a–38a of distribution. These central points 31a–38a of fuel jet distribution, which are also referred to collectively as central points 30a, do not lie on the spark plug 16 but are located around the electrode 17, slightly separated therefrom. Specifically, the central points 31a and 32a of fuel jet distribution are vertically arranged on one side of the electrode 17. Similarly, the central points 33a and 34a of fuel jet distribution are vertically arranged on the opposite side of the electrode 17. The central points 35a–38a of fuel jet distribution are horizontally aligned beneath the electrode 17.

A rich mixture zone 30b, shown by hatching in the imaginary plane 90, is a region in which a relatively rich mixture is distributed at each ignition point. The rich mixture zone 30b formed around the central points 30a of fuel jet distribution surrounds but does not include the spark plug 16 as illustrated. Formed on the outside of the rich mixture zone 30b is an ignitable mixture zone 30c, in which a mixture slightly leaner than the mixture in the rich mixture zone 30b is created. The mixture in the ignitable mixture zone 30c is readily ignitable having an appropriate air-fuel ratio. A yet leaner mixture is distributed farther on the outside of the ignitable mixture zone 30c. It is to be noted, however, that boundaries of the individual zones are not so distinct as illustrated in FIG. 5. In actuality, the mixture is formed in stratified layers centered around the individual central points 30a of fuel jet distribution with the air-fuel ratio continuously increasing outward. The boundaries of the individual zones are shown in FIG. 5 just for the sake of explanation and this applies to the following illustrations as well.

Since the distribution of fuel densities at the ignition point is controlled as described above, the electrode 17 of the spark plug 16 exists in the ignitable mixture zone 30c so that the amount of fuel droplets adhering to the electrode 17 is smaller than a case where the electrode 17 is located in the rich mixture zone 30b. Furthermore, the air-fuel ratio around the electrode 17 is properly regulated to an ignitable level so that the mixture surrounding the electrode 17 would not become excessively rich.

It should be noted that as long as the central points 30a of fuel jet distribution do not lie on the spark plug 16 but are located around the electrode 17, slightly separated therefrom, the nozzle openings 30 in the nozzle opening area 26 of the injector 14 may be arranged differently from the first embodiment. In addition, the nozzle openings 30 need not necessarily be arranged strictly vertically or horizontally.

Other specific embodiments of the invention are described below with reference to the attached drawings, in which elements identical to those of the first embodiment are designated by the same reference numerals and a description of such elements is omitted. In the context of the following discussion, rich mixture zones refer to regions in which a relatively rich mixture is distributed and ignitable mixture zones refer to regions in which a mixture slightly leaner than the mixture in the rich mixture zone 30b but readily ignitable having an appropriate air-fuel ratio is distributed.

Second Embodiment

Figure 6A:
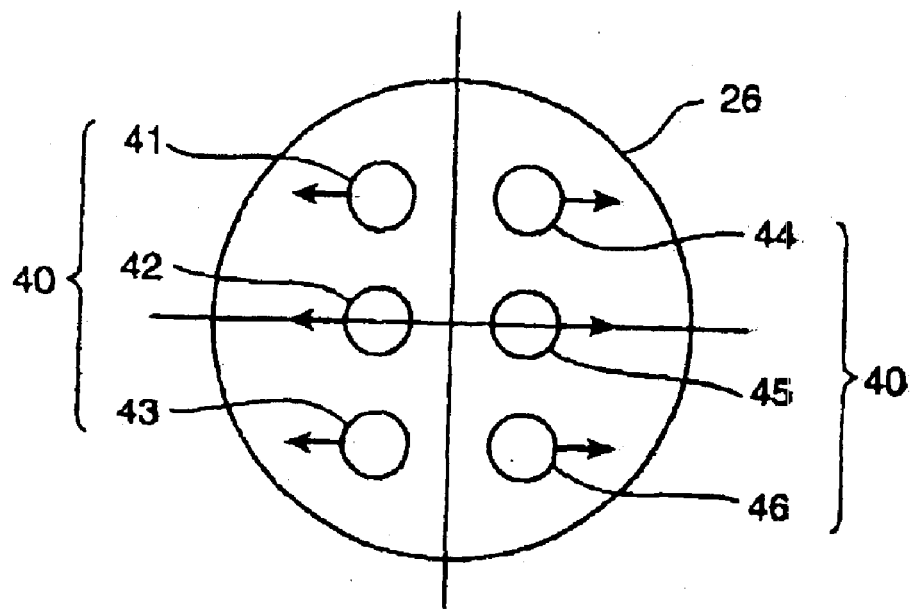
FIGS. 6A and 6B are diagrams showing how nozzle openings are arranged and how fuel jets spewed out of the individual nozzle openings are distributed immediately before ignition according to a second embodiment of the invention, respectively.
Figure 6B:
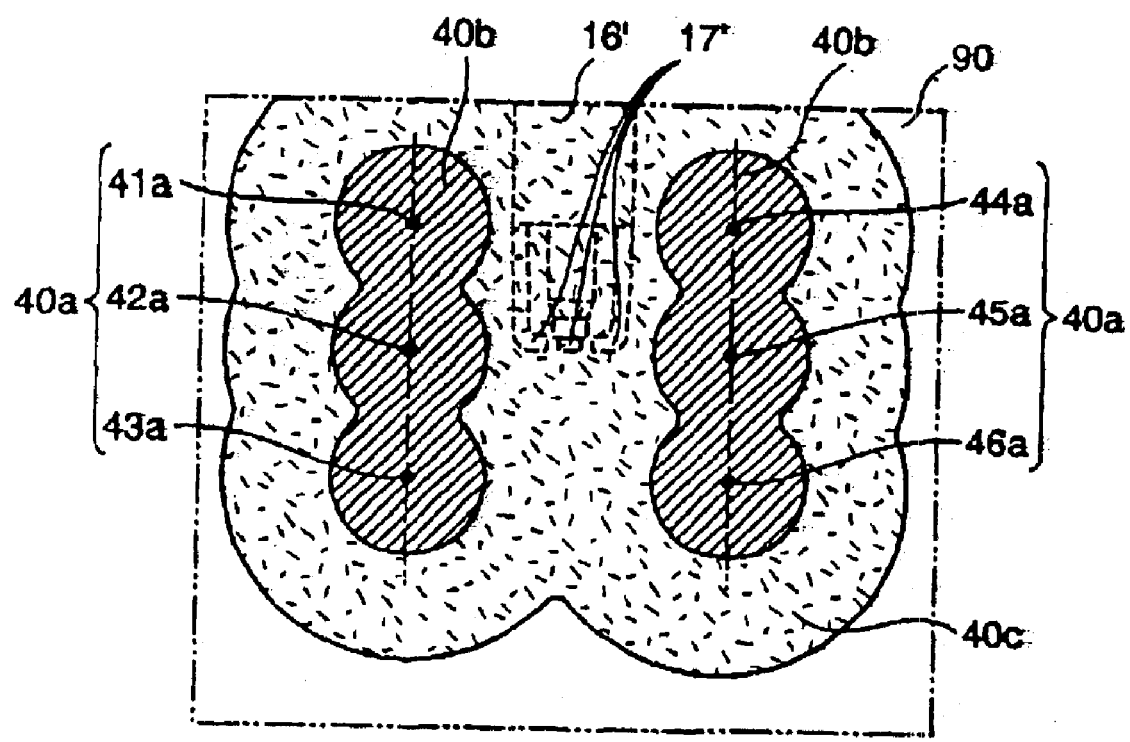

FIG. 6A is a diagram showing the arrangement of openings 41–46 formed in a nozzle opening area 26 of an injector 14 according to a second embodiment of the invention, and FIG. 6B is a diagram showing how fuel jets spewed out of the individual openings 41–46 are distributed in an imaginary plane 90 immediately before ignition. As will be easily noticed, FIGS. 6A and 6B correspond to FIGS. 4 and 5 showing the first embodiment, respectively.

As depicted in FIG. 6A, there are formed six openings 41–46, which are also referred to collectively as openings 40, in the nozzle opening area 26 of the injector 14. The openings 41–43 are vertically arranged in the left half of the nozzle opening area 26, and the openings 44–46 are vertically arranged in the right half of the nozzle opening area 26. Axis lines of the openings 41–43 are inclined to the left in front view, while axis lines of the openings 44–46 are inclined to the right as shown by arrows in FIG. 6A. With the axis lines of the openings 40 arranged in this manner, central axes of the fuel jets spewed out of the individual openings 40 extend in directions determined by adding the angles of additional inclination of the axis lines of the individual openings 40 to the inclination angles of radii of an ordinary radial pattern.

The fuel jets spewed out of the individual openings 40 are distributed as shown in FIG. 6B as they reach the imaginary plane 90 which intersects the spark plug 16. As depicted in FIG. 6B, central points 41a–46a of fuel jet distribution, which are also referred to collectively as central points 40a, do not lie on the spark plug 16 but are located around the electrode 17, slightly separated therefrom. Specifically, the central points 41a–43a of fuel jet distribution are vertically arranged on one side of the electrode 17. Similarly, the central points 44a–46a of fuel jet distribution are vertically arranged on the opposite side of the electrode 17.

As a result, rich mixture zones 40b shown by hatching in the imaginary plane 90 are formed on both sides of the spark plug 16 and an ignitable mixture zone 40c surrounds the rich mixture zones 40b. As in the first embodiment, a yet leaner mixture is distributed farther on the outside of the ignitable mixture zone 40c.

Since the distribution of fuel densities at the ignition point is controlled as described above, the electrode 17 of the spark plug 16 exists in the ignitable mixture zone 40c so that the amount of fuel droplets adhering to the electrode 17 is smaller than a case where the electrode 17 is located in one of the rich mixture zones 40b. Furthermore, the air-fuel ratio around the electrode 17 is properly regulated to an ignitable level so that the mixture surrounding the electrode 17 would not become excessively rich.

Third Embodiment

Figure 7A:
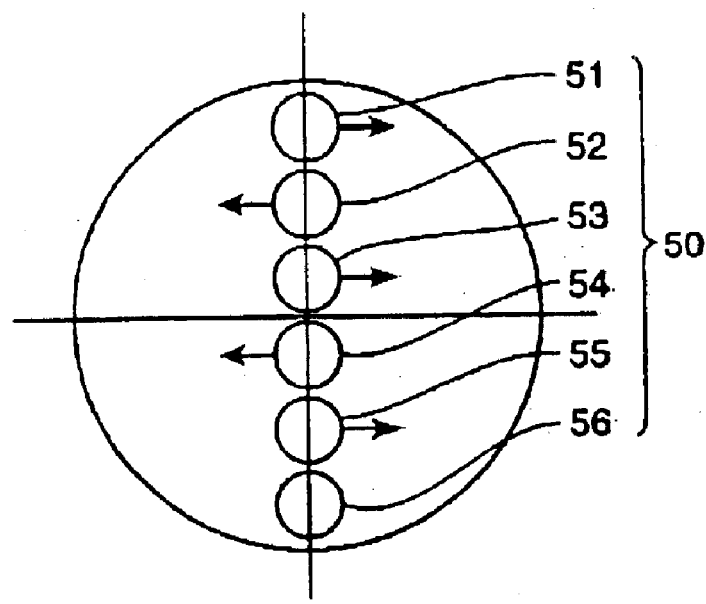
FIGS. 7A and 7B are diagrams showing how nozzle openings are arranged and how fuel jets spewed out of the individual nozzle openings are distributed immediately before ignition according to a third embodiment of the invention, respectively.
Figure 7B:
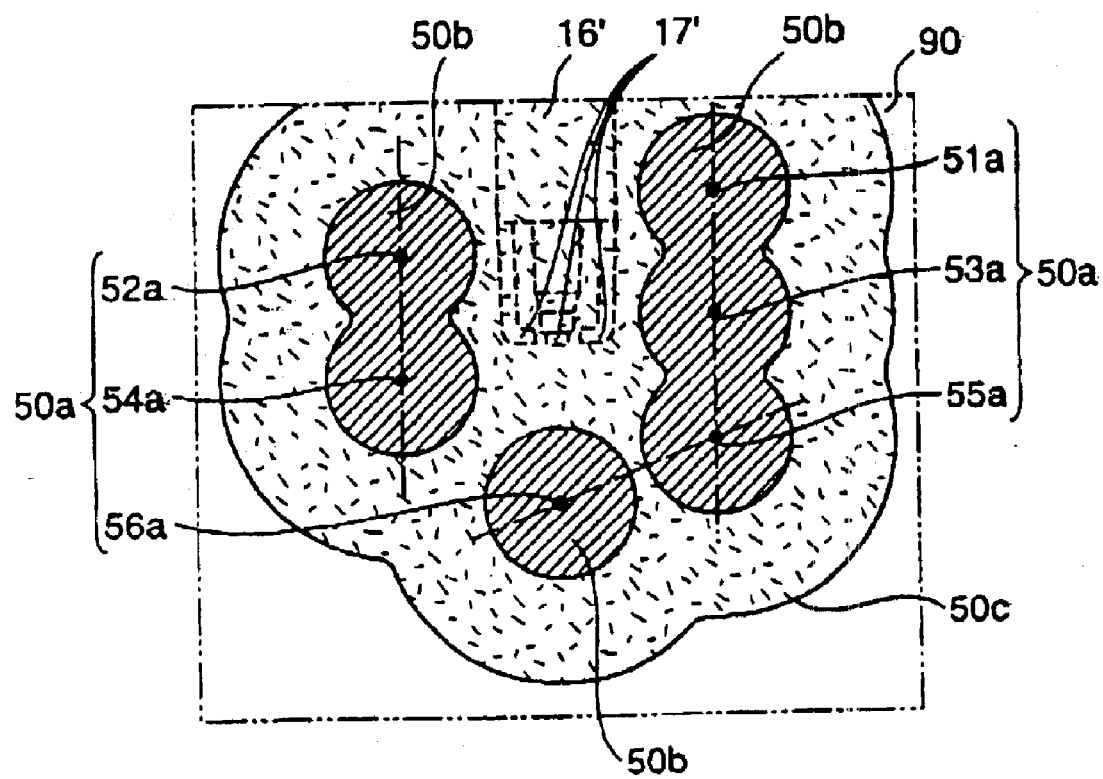

FIG. 7A is a diagram showing the arrangement of openings 51–56 formed in a nozzle opening area 26 of an injector 14 according to a third embodiment of the invention, and FIG. 7B is a diagram showing how fuel jets spewed out of the individual openings 51–56 are distributed in an imaginary plane 90 immediately before ignition. As will be easily noticed, FIGS. 7A and 7B correspond to FIGS. 4 and 5 showing the first embodiment, respectively.

As depicted in FIG. 7A, there are formed six openings 51–56, which are also referred to collectively as openings 50, in the nozzle opening area 26 of the injector 14. The openings 51–56 are arranged on a vertical center line of the nozzle opening area 26. Axis lines of the openings 51, 53 and 55 are inclined to the right in front view, axis lines of the openings 52 and 54 are inclined to the left as shown by arrows in FIG. 7A, and an axis line of the opening 56 is not inclined either way. With the axis lines of the openings 50 arranged in this manner, central axes of the fuel jets spewed out of the individual openings 50 extend in directions determined by adding the angles of additional inclination of the axis lines of the individual openings 50 to the inclination angles of radii of an ordinary radial pattern.

The fuel jets spewed out of the individual openings 50 are distributed as shown in FIG. 7B as they reach the imaginary plane 90 which intersects the spark plug 16. As depicted in FIG. 7B, central points 51a–56a of fuel jet distribution, which are also referred to collectively as central points 50a, do not lie on the spark plug 16 but are located around the electrode 17, slightly separated therefrom. Specifically, the central points 52a and 54a of fuel jet distribution are vertically arranged on one side of the electrode 17. Similarly, the central points 51a, 53a and 55a of fuel jet distribution are vertically arranged on the opposite side of the electrode 17. The central points 55a and 56a of fuel jet distribution are arranged generally side of side beneath the electrode 17. In this fuel jet arrangement, the fuel distribution around the central point 55a serves to connect the horizontal and vertical fuel jet distributions.

As a result, rich mixture zones 50b shown by hatching in the imaginary plane 90 are formed on both sides of and beneath the spark plug 16 and an ignitable mixture zone 50c surrounds the rich mixture zones 50b. As in the foregoing embodiments, a yet leaner mixture is distributed farther on the outside of the ignitable mixture zone 50c.

Fourth Embodiment

Figure 8A:
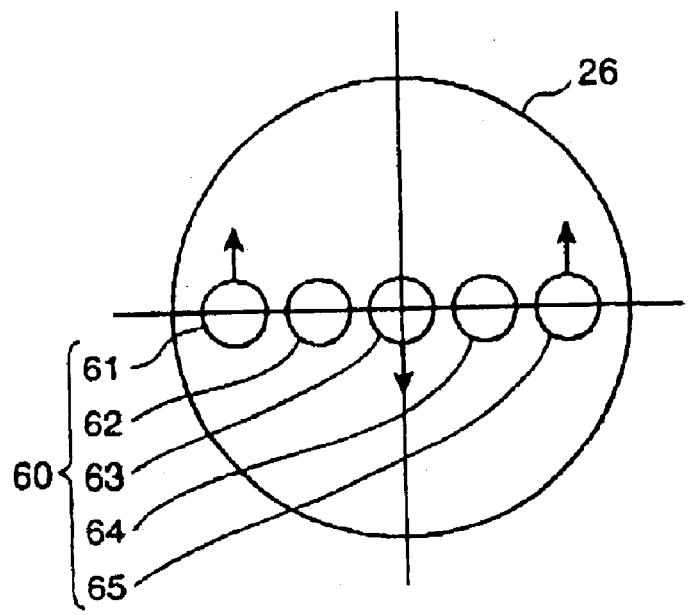
FIGS. 8A and 8B are diagrams showing how nozzle openings are arranged and how fuel jets spewed out of the individual nozzle openings are distributed immediately before ignition according to a fourth embodiment of the invention, respectively.
Figure 8B:
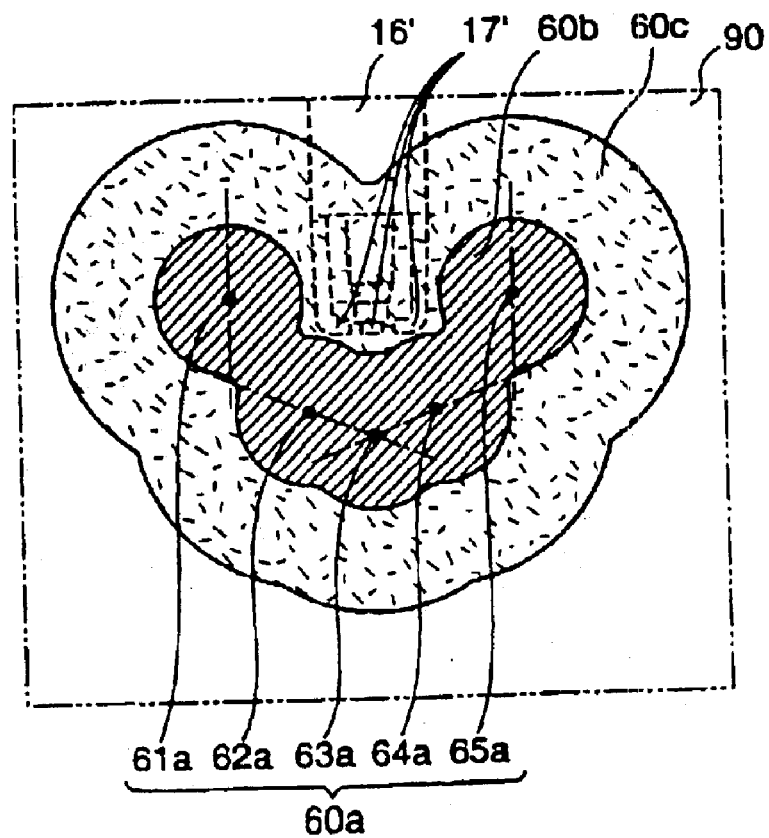

FIG. 8A is a diagram showing the arrangement of openings 61–65 formed in a nozzle opening area 26 of an injector 14 according to a fourth embodiment of the invention, and FIG. 8B is a diagram showing how fuel jets spewed out of the individual openings 61–65 are distributed in an imaginary plane 90 immediately before ignition. As will be easily noticed, FIGS. 8A and 8B correspond to FIGS. 4 and 5 showing the first embodiment, respectively.

As depicted in FIG. 8A, there are formed five openings 61–65, which are also referred to collectively as openings 60, in the nozzle opening area 26 of the injector 14. The openings 61–65 are arranged side by side on a horizontal center line of the nozzle opening area 26. Axis lines of the openings 61 and 65 are inclined upward in front view, an axis line of the opening 63 is inclined downward as shown by arrows in FIG. 8A, and axis lines of the openings 62 and 64 are not inclined either way. The angle of inclination of the openings 61 and 65 is larger than that of the opening 63. With the axis lines of the openings 60 arranged in this manner, central axes of the fuel jets spewed out of the individual openings 60 extend in directions determined by adding the angles of additional inclination of the axis lines of the individual openings 60 to the inclination angles of radii of an ordinary radial pattern.

The fuel jets spewed out of the individual openings 60 are distributed as shown in FIG. 8B as they reach the imaginary plane 90 which intersects the spark plug 16. As depicted in FIG. 8B, central points 61a–65a of fuel jet distribution, which are also referred to collectively as central points 60a, do not lie on the spark plug 16 but are located around the electrode 17, slightly separated therefrom. Specifically, the central points 61a and 65a of fuel jet distribution are arranged on the left and right sides of the electrode 17, respectively, and the central points 62a–64a of fuel jet distribution are arranged generally horizontally beneath the electrode 17.

As a result, a rich mixture zone 60b shown by hatching in the imaginary plane 90 is distributed on both sides of and beneath the spark plug 16 and an ignitable mixture zone 60c surrounds the rich mixture zone 60b. As in the foregoing embodiments, a yet leaner mixture is distributed farther on the outside of the ignitable mixture zone 60c.

Fifth Embodiment

Figure 9A:
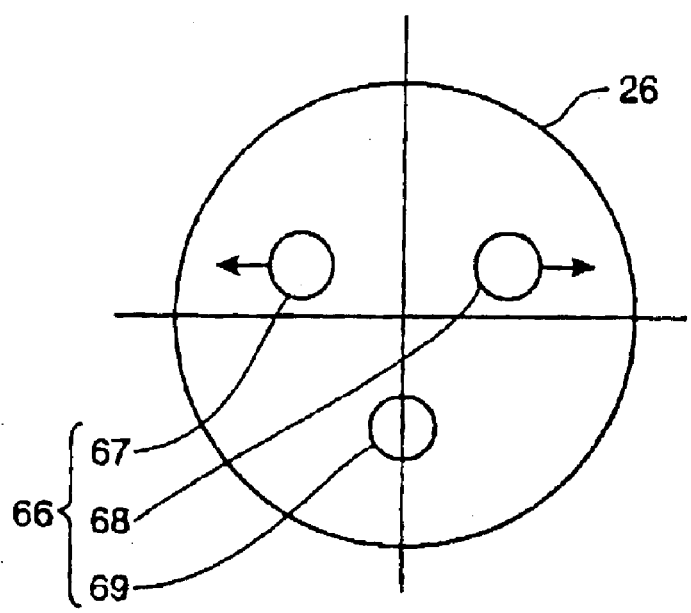
FIGS. 9A and 9B are diagrams showing how nozzle openings are arranged and how fuel jets spewed out of the individual nozzle openings are distributed immediately before ignition according to a fifth embodiment of the invention, respectively.
Figure 9B:
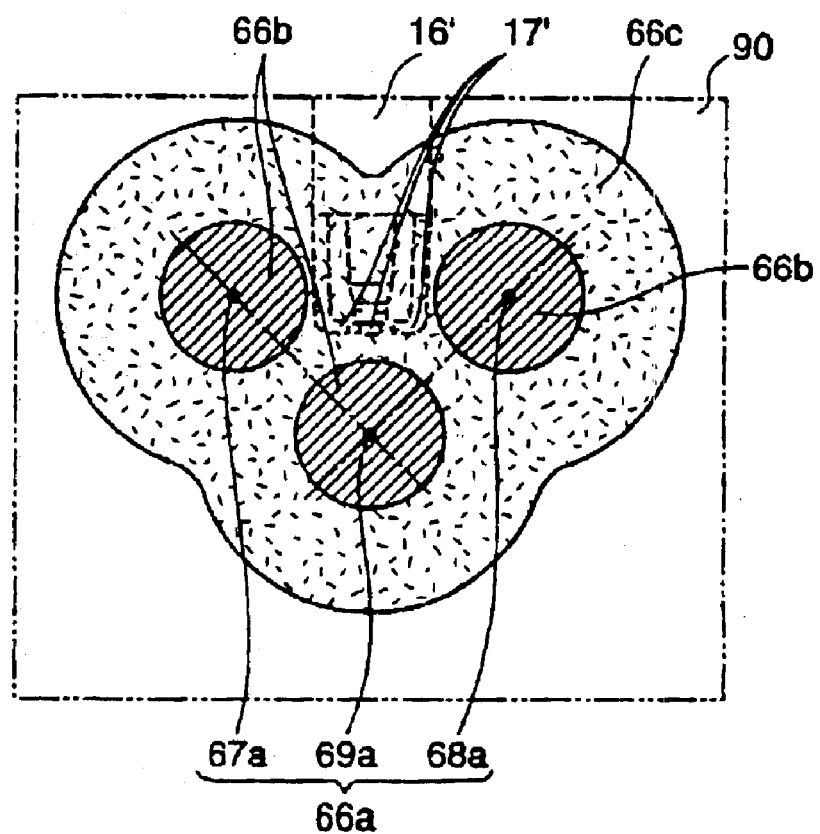

FIG. 9A is a diagram showing the arrangement of openings 67–69 formed in a nozzle opening area 26 of an injector 14 according to a fifth embodiment of the invention, and FIG. 9B is a diagram showing how fuel jets spewed out of the individual openings 67–69 are distributed in an imaginary plane 90 immediately before ignition. As will be easily noticed, FIGS. 9A and 9B correspond to FIGS. 4 and 5 showing the first embodiment, respectively.

As depicted in FIG. 9A, there are formed three openings 67–69, which are also referred to collectively as openings 66, in the nozzle opening area 26 of the injector 14. The openings 67 and 68 are arranged side by side in an upper half of the nozzle opening area 26, and the opening 69 is located on a vertical center line of the nozzle opening area 26 in its lower half. Axis lines of the openings 67 and 68 are inclined to the left and right in front view, respectively, as shown by arrows in FIG. 9A. With the axis lines of the openings 66 arranged in this manner, central axes of the fuel jets spewed out of the individual openings 66 extend in directions (left and right) determined by adding the angles of additional inclination of the axis lines of the individual openings 66 to the inclination angles of radii of an ordinary radial pattern.

The fuel jets spewed out of the individual openings 66 are distributed as shown in FIG. 9B as they reach the imaginary plane 90 which intersects the spark plug 16. As depicted in FIG. 9B, central points 67a–69a of fuel jet distribution, which are also referred to collectively as central points 66a, do not lie on the spark plug 16 but are located around the electrode 17, slightly separated therefrom. Specifically, the central points 67a and 68a of fuel jet distribution are arranged on the left and right sides of the electrode 17, and the central points 69a of fuel jet distribution is located beneath the electrode 17.

As a result, rich mixture zones 66b shown by hatching in the imaginary plane 90 are distributed on both sides of and beneath the spark plug 16 and an ignitable mixture zone 66c surrounds the rich mixture zones 66b. As in the foregoing embodiments, a yet leaner mixture is distributed farther on the outside of the ignitable mixture zone 66c.

Sixth Embodiment

While the injector 14 of the foregoing embodiments injects fuel from the single nozzle opening area 26, the injector 14 may have multiple fuel injection areas. This is achieved by use of multiple injectors 14 or a multiple-nozzle injector 14a shown in FIG. 10.

FIG. 10 is a perspective view of the injector 14a according to a sixth embodiment of the invention. The injector 14a has a pair of nozzles 24, 24a projecting into the combustion chamber 5. There are formed nozzle opening areas 26, 26a at central parts of extreme and surfaces of the nozzles 24, 24a, respectively. Nozzle openings are formed in the nozzle opening areas 26, 26a. The injector 14a injects the fuel introduced through a joint 20 from the individual nozzle opening areas 26, 26a when a built-in solenoid (not shown) is actuated.

FIG. 11 is an enlarged diagram of the nozzle opening areas 26, 26a of the injector 14a as viewed in the direction of arrow B shown in FIG. 10. The nozzle opening areas 26, 26a of FIG. 11 are illustrated such that their upward and downward directions match those of FIG. 1.

Five nozzle openings 71–75, which are also referred to collectively as openings 70, are formed in the nozzle opening area 26. Likewise, five nozzle openings 81–85, which are also referred to collectively as openings 80, are formed in the nozzle opening area 26a. The fuel is injected from the individual openings 70, 80 to produce fuel jets which together form a pair of fuel sprays 15. Since the extreme end surfaces of the individual nozzles 24, 24a of the injector 14a including the nozzle opening areas 26, 26a are slightly convex-shaped, central axes of the fuel jets are directed generally radially from the individual openings 70, 80.

As illustrated in FIG. 11, the opening 71, 72 and 74 are arranged on a vertical center line of the nozzle opening area 26. Similarly, the opening 81, 82 and 84 are arranged on a vertical center line of the nozzle opening area 26a. The openings 73–75 are horizontally aligned in a lower part of the nozzle opening area 26. Similarly, the openings 83–85 are horizontally aligned in a lower part of the nozzle opening area 26a.

Figure 12:
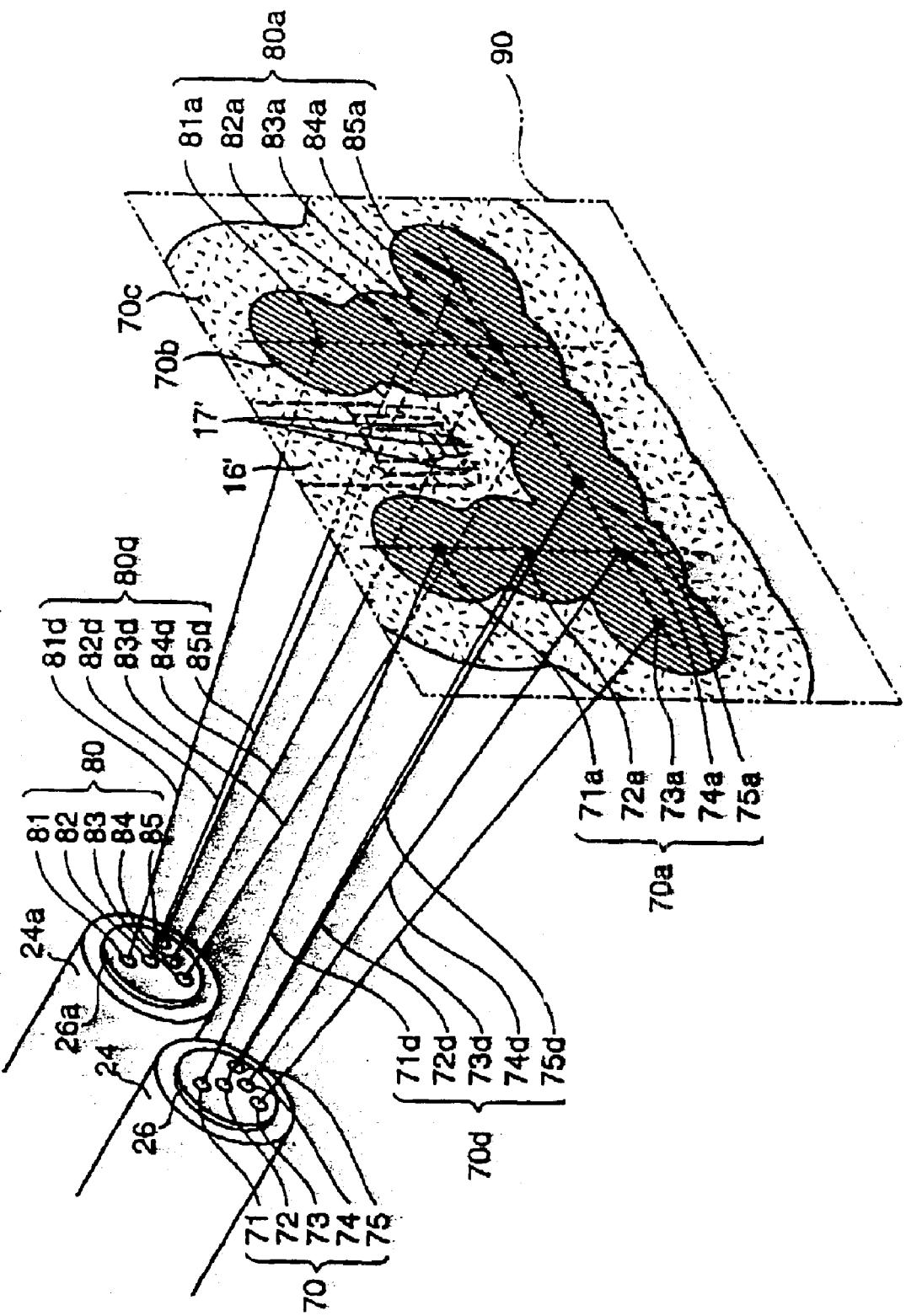
FIG. 12 is a diagram showing how individual fuel jets spewed from the injector are distributed immediately before ignition according to the sixth embodiment.

FIG. 12 is a diagram showing how the fuel jets spewed from the injector 14a are distributed as they reach the proximity of the electrode 17 of the spark plug 16 immediately before ignition. In FIG. 12, the nozzle opening areas 26, 26a are enlarged for ease of understanding and a plane 90 shown by alternate long and two short dashed lines if a vertical imaginary plane in which the spark plug 16 is located. The numerals 16' and 17' indicate the locations of the spark plug 16 and the electrode 17 (shown by broken lines) in the imaginary plane 90, respectively.

The fuel jets ejected from the nozzle openings 70 move generally toward the spark plug 16 while spreading around their respective central axes 71d–75d, which are also referred to collectively as central axes 70d. Likewise, the fuel jets ejected from the nozzle openings 80 move generally toward the spark plug 16 while spreading around their respective central axes 81d–85d, which are also referred to collectively as central axes 80d. The central axes 70d of the individual fuel jets spewed out of the nozzle openings 70 hit the imaginary plane 90 intersecting the spark plug 16 at their respective central points 71a–75a of distribution. Likewise, the central axes 80d of the individual fuel jets spewed out of the nozzle openings 80 hit the imaginary plane 90 intersecting the spark plug 16 at their respective central points 81a–85a of distribution. The central points 71a–75a of fuel jet distribution, which are also referred to collectively as central points 70a, and the central points 81a–85a of fuel jet distribution, which are also referred to collectively as central points 80a, do not lie on the spark plug 16 but are located around the electrode 17, slightly separated therefrom. Specifically, the central points 71a, 72a and 74a of fuel jet distribution are vertically arranged on one side of the electrode 17. Similarly, the central points 81a, 82a and 84a of fuel jet distribution are vertically arranged on the opposite side of the electrode 17. The central points 73a–75a and 83a–85a of fuel jet distribution are horizontally aligned beneath the electrode 17.

As a result, a rich mixture zone 70b shown by hatching in the imaginary plane 90 is distributed on both sides of and beneath the spark plug 16 and an ignitable mixture zone 70c surrounds the rich mixture zone 70b. As in the foregoing embodiments, a yet leaner mixture is distributed farther on the outside of the ignitable mixture zone 70c.

According to the aforementioned second to sixth embodiments, the electrode 17 of the spark plug 16 exists in the ignitable mixture zone (40c, 50c, 66c, 70c) and, therefore, the amount of fuel droplets adhering to the electrode 17 is smaller than a case where the electrode 17 is located in the rich mixture zone (40b, 50b, 60b, 66b, 70b), as in the first embodiment. Furthermore, the air-fuel ratio around the electrode 17 is properly regulated to an ignitable level so that the mixture surrounding the electrode 17 would not become excessively rich.

In a case where the fuel is sprayed from the nozzle opening areas 26, 26a of the multiple nozzles 24, 24a as in the sixth embodiment, the amount of fuel injected from the individual nozzles 24, 24a per engine cycle is divided between them, so that the amount of fuel injected from each nozzle opening area 26, 26a at each injection point is decreased. This serves to further accelerate atomization of the fuel. If the fuel is injected with a specific time delay, the fuel injected from the individual nozzles 24, 24a disperses during different periods of time up to each ignition point, producing a difference in fuel density at the ignition point between the fuel sprays 15 discharged from the two nozzles 24, 24a. For example, if the fuel is injected from the openings 80 of the nozzle 24a with a specific time delay after injection from the openings 70 of the nozzle 24, there are formed relatively broadly distributed masses of fuel mist of varying fuel densities at the ignition point containing the fuel spray 15 discharged from the openings 70, which has become leaner, and the fuel spray 15 discharged from the openings 80, which remains still rich. Note though unillustrated in FIG. 10, an adequate means for controlling the fuel injection timings for the nozzles 24, 24a is provided to the engine of the present invention.

This kind of multiple-nozzle system makes it possible to finely control fuel distribution in the combustion chamber 5, particularly around the spark plug 16 and its fuel spray 15, by properly determining fuel injection intervals. This enables formation of a mixture having a fuel density distribution optimized for engine operating conditions. Furthermore, since the amount of injected fuel is divided between different groups of the openings 70, 80, there is no lower limit in fuel injection intervals. Unlike an ordinary time-split fuel injection system in which the fuel is injected more than once with a specific time delay from the same nozzle, the multiple-nozzle system of the invention injects the fuel from different nozzles with a time delay. Note that, though unillustrated in FIG. 12, a specific member for controlling the fuel injection timings is provided to the engine of the present invention. This makes it possible to determine the intervals between successive fuel injection points with a large degree of freedom, from relatively long to zero intervals.

As an alternative to the aforementioned structure of the sixth embodiment, there may be provided two injectors 14 each having a single nozzle opening area 26 instead of the two-nozzle injector 14a. Still alternatively, a multiple-nozzle injector having three or more nozzles, or three or more injectors 14 each having a single nozzle opening area 26, may be used instead of the two-nozzle injector 14a. Also, intervals between successive fuel injection points may be determined as appropriate, without excluding the possibility of zero intervals.

It is to be understood that the invention is not limited to the aforementioned arrangements of the central points of fuel jet distribution or nozzle opening patterns of the first to sixth embodiments. Various alternatives and variations of the embodiments are possible as long as the central points of distribution of fuel jets discharged from individual nozzle openings do not lie on the spark plug but are located around its electrode. Furthermore, the nozzle openings need not necessarily be obliquely formed to set the axis lines of the individual nozzle openings at specified angles of inclination. It is possible to give the axis lines of the nozzle openings the desired angles of inclination by carefully arranging the nozzle openings and properly determining the direction of the axis line of each nozzle as in the sixth embodiment, for example.

Having mentioned the above, we would like to sum up the present invention as follows.

According to the invention, a direct-injection spark-ignition engine includes a spark plug provided approximately at the center of the ceiling of a combustion chamber, and an injector having at its downstream end a nozzle which is located in an upper peripheral area of the combustion chamber, in which multiple openings are formed in the nozzle of the injector. In this direct-injection engine, fuel is injected from the nozzle of the injector directly toward the proximity of an electrode of the spark plug, and the directions of axis lines of the individual nozzle openings are set such that central points of fuel jets spewed out of the individual nozzle openings do not lie on the spark plug but are distributed around the electrode, slightly separated therefrom.

This construction of the invention helps accelerate evaporation and atomization of the fuel as the fuel is injected through the multiple nozzle openings and dispersed in the form of fine particles. Since the central points of the fuel jets spewed out of the nozzle openings do not lie on the spark plug, it is possible to reduce the amount of fuel droplets adhering to the electrode and its surrounding areas. Furthermore, since the central points of the fuel jets, where the richest masses of fuel mist are present, are distributed around the electrode, slightly separated therefrom, it is possible to prevent formation of an excessively rich mixture at the electrode and properly regulate the air-fuel ratio around it to an ignitable level.

The direct-injection spark-ignition engine thus constructed serves to achieve an increase in engine power, an improvement in fuel economy and a reduction in the amount of emissions.

In one feature of the invention, at least part of the central points of the fuel jets spewed out of the nozzle openings are distributed at least in one generally vertical line on one side of the spark plug electrode.

According to this feature of the invention, vertically elongate layers of a rich mixture can be formed beside the spark plug electrode, so that a flame produced as the spark plug electrode ignites the mixture quickly propagates sideways, resulting in satisfactory combustion.

At least part of the nozzle openings may be arranged at least in one generally vertical line. If the nozzle openings are arranged in this way, it is possible to distribute at least part of the central points of the fuel jets in a generally vertical line on one side of the spark plug electrode by simply forming the nozzle openings such that their axis lines are vertically inclined. This facilitates formation of the nozzle openings for achieving satisfactory combustion.

In another feature of the invention, at least part of the central points of the fuel jets are distributed at least in one generally horizontal line beneath the spark plug electrode.

According to this feature of the invention, horizontally elongate layers of a rich mixture can be formed beneath the spark plug electrode, so that a flame produced as the spark plug electrode ignites the mixture quickly propagates downward, resulting in satisfactory combustion.

At least part of the nozzle openings may be arranged at least in one generally horizontal line. If the nozzle openings are arranged in this way, it is possible to distribute at least part of the central points of the fuel jets in a generally horizontal line beneath the spark plug electrode by simply forming the nozzle openings such that their axis lines are horizontally inclined. This facilitates formation of the nozzle openings for achieving satisfactory combustion.

In another feature of the invention, at least part of the central points of the fuel jets are distributed at least in one generally vertical line on one side of the electrode and at least part of the central points of the fuel jets are distributed at least in one generally horizontal line beneath the electrode.

According to this feature of the invention, it is possible to form vertically elongate rich mixture layers beside the spark plug electrode and horizontally elongate rich mixture layers beneath the spark plug electrode, so that a flame produced as the spark plug electrode ignites the mixture quickly propagates sideways and downward, resulting in satisfactory combustion.

The nozzle openings may be formed such that at least part of the nozzle openings are arranged at least in one generally vertical line and at least part of the nozzle openings are arranged at least in one generally horizontal line. If the nozzle openings are arranged in this way, it is possible to distribute at least part of the central points of the fuel jets in a generally vertical line on one side of the spark plug electrode and at least part of the central points of the fuel jets in a generally horizontal line beneath the spark plug electrode by simply forming the nozzle openings such that their axis lines are vertically or horizontally inclined. This facilitates formation of the nozzle openings for achieving satisfactory combustion.

One injector having multiple nozzle openings in the nozzle is provided for each cylinder of the engine, and the multiple nozzle openings are arranged such that at least part of the central points of the fuel jets are distributed at least in one generally vertical line on one side of the electrode and at least part of the central points of the fuel jets are distributed at least in one generally horizontal line beneath the electrode as stated above.

Alternatively, more than one injector having multiple nozzle openings in the nozzle is provided for each cylinder of the engine, and the nozzle openings of each injector are arranged to create the same distribution of the central points of the fuel jets as stated above.

Still alternatively, the injector has more than one nozzle having multiple nozzle openings, and the nozzle openings of each nozzle are arranged to create the same distribution of the central points of the fuel jets as stated above.

According to these constructions, it is possible to produce the desired arrangement of the nozzle openings with one or more injectors per cylinder or with the injector having one or more nozzles. This flexibility enhances the degree of freedom in the arrangement of the nozzle openings.

In still another feature of the invention, the fuel to be injected per engine cycle is divided into portions which are separately injected with a specific time delay.

As the total amount of fuel injected per engine cycle is divided in this arrangement, the amount of fuel injected at each injection point is decreased. This serves to further accelerate atomization of the fuel. If the divided portions of the fuel are injected with a specific time delay, the injected fuel disperses during different periods of time from injection to each ignition point. This makes it possible to produce a difference in fuel density between different masses of fuel mist at the ignition point. According to this time-split fuel injection scheme, there are formed distributed masses of fuel mist of varying fuel densities at the ignition point. This makes it possible to form a mixture having a fuel density distribution optimized for engine operating conditions by properly determining fuel injection intervals.

There may be provided more than one injector per cylinder or the injector may be provided with more than one nozzle such that the fuel can be injected from one nozzle after another with a specific time delay.

Unlike an ordinary time-split fuel injection system in which the fuel is injected more than once with a specific time delay from the same nozzle, the aforementioned multiple-nozzle system of the invention injects the fuel from different nozzles with a time delay. This makes it possible to determine the intervals between successive fuel injection points with a large degree of freedom, from relatively long to zero intervals.

This application is based on Japanese Patent Application Serial No. 2002-170298, filed in Japan Patent Office on Jun. 11, 2002, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. A direct-injection spark-ignition engine comprising:
a spark plug provided approximately at the center of the ceiling of a combustion chamber; and
an injector having at its downstream end a nozzle which is located in an upper peripheral area of the combustion chamber;
wherein fuel is injected from the nozzle of said injector directly toward the proximity of an electrode of said spark plug, said injector having multiple openings formed in the nozzle, and the directions of axis lines of the individual openings are set such that central points of fuel jets spewed out of the individual openings avert from said spark plug and are distributed around the electrode, slightly separated therefrom;
wherein at least part of said central points of the fuel jets are arranged at least in one generally vertical line drawn on one side of the electrode.

2. The direct-injection spark-ignition engine according to claim 1, wherein at least part of said openings are arranged at least in one generally vertical line.

3. A direct-injection spark-ignition engine comprising:
a spark plug provided approximately at the center of the ceiling of a combustion chamber; and
an injector having at its downstream end a nozzle which is located in an upper peripheral area of the combustion chamber:
wherein fuel is injected from the nozzle of said injector directly toward the proximity of an electrode of said spark plug, said injector having multiple openings formed in the nozzle, and the directions of axis lines of the individual openings are set such that central points of fuel jets spewed out of the individual openings avert from said spark plug and are distributed around the electrode, slightly separated therefrom;
wherein at least part of said central points of the fuel jets are distributed at least in one generally vertical line on one side of the electrode and at least part of said central points of the fuel jets are distributed at least in one generally horizontal line beneath the electrode.

4. The direct-injection spark-ignition engine according to claim 3, wherein at least part of said openings are arranged at least in one generally vertical line and at least part of said openings are arranged at least in one generally horizontal line.

5. The direct-injection spark-ignition engine according to claim 3, wherein one injector having the multiple openings in the nozzle is provided for each cylinder of said engine, and the multiple openings are arranged such that said central points of the fuel jets are arranged at least in one generally vertical line on one side of the electrode and at least part of said central points of the fuel jets are arranged at least in one generally horizontal line drawn beneath the electrode.

6. The direct-injection spark-ignition engine according to claim 3, wherein more than one injector having the multiple openings in the nozzle is provided for each cylinder of said engine, and the openings of each injector are arranged such that said central points of the fuel jets are arranged at least in one generally vertical line on one side of the electrode and at least part of said central points of the fuel jets are arranged at least in one generally horizontal line drawn beneath the electrode.

7. The direct-injection spark-ignition engine according to claim 3, wherein said injector has more than one nozzle having the multiple openings, and the openings of each nozzle are arranged such that said central points of the fuel jets are arranged at least in one generally vertical line on one side of the electrode and at least part of said central points of the fuel jets are arranged at least in one generally horizontal line drawn beneath the electrode.

8. A direct-injection spark-ignition engine comprising:
a spark plug provided approximately at the center of the ceiling of a combustion chamber; and
an injector having at its downstream end a nozzle which is located in an upper peripheral area of the combustion chamber;
wherein fuel is injected from the nozzle of said injector directly toward the proximity of an electrode of said spark plug, said injector having multiple openings formed in the nozzle, and the directions of axis lines of the individual openings are set such that central points of fuel jets spewed out of the individual openings avert from said spark plug and are distributed around the electrode, slightly separated therefrom; and
wherein the central points of the fuel jet distribution are arranged on the left and right sides of the electrode and the other central point of fuel jet distribution is located beneath the electrode such that said central points altogether form vertices of a triangle.

* * * * *